J. W. ELLIS.
SAFETY APPLIANCE.
APPLICATION FILED NOV. 24, 1915.
1,204,144. Patented Nov. 7, 1916.
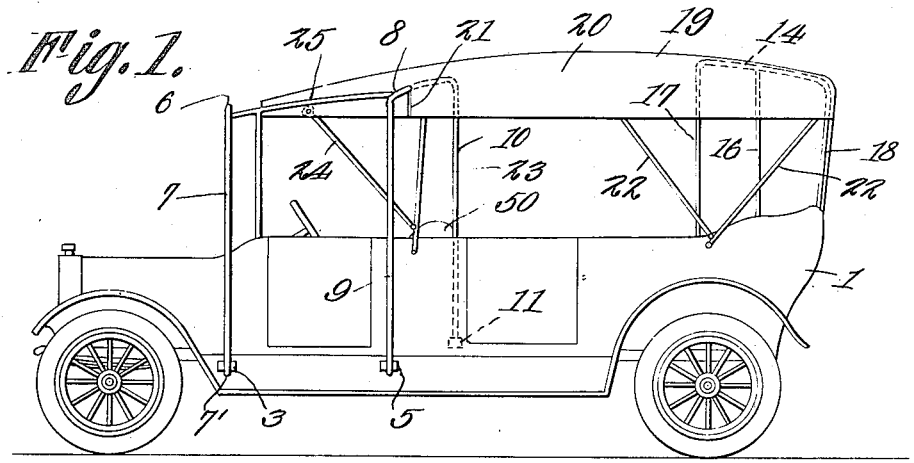
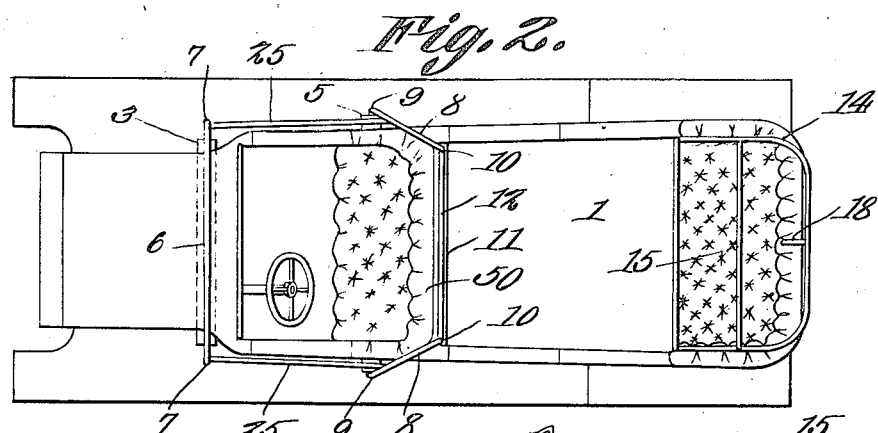
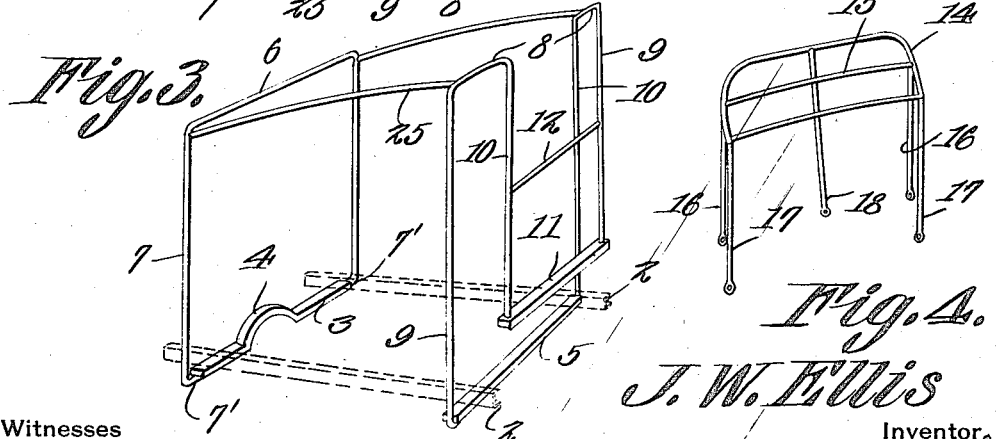
J. W. Ellis, Inventor

UNITED STATES PATENT OFFICE.

JAMES WILLIAM ELLIS, OF BASSETT, NEBRASKA.

SAFETY APPLIANCE.

1,204,144.          Specification of Letters Patent.      Patented Nov. 7, 1916.

Application filed November 24, 1915. Serial No. 63,248.

*To all whom it may concern:*

Be it known that I, JAMES WILLIAM ELLIS, a citizen of the United States, residing at Bassett, in the county of Rock and State of Nebraska, have invented a new and useful Safety Appliance, of which the following is a specification.

The device forming the subject matter of this application is a safety appliance adapted to be applied to a motor propelled vehicle, and the invention aims to provide a structure of this sort so constructed that should the vehicle overturn, the occupants of the vehicle will not be injured.

The invention aims to provide a structure of the sort above mentioned which may readily be applied to an automobile, the construction being such that unusual strength is afforded.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—Figure 1 shows in perspective, a vehicle equipped with the device forming the subject matter of this application; Fig. 2 is a top plan of a vehicle whereunto the structure forming the subject matter of this application has been applied, the cover of the vehicle being removed; Fig. 3 is a perspective view delineating the forward supporting frame; and Fig. 4 is a perspective view delineating the rear supporting frame.

In the accompanying drawings, the numeral 1 indicates the body of a motor propelled vehicle supported on a chassis 2.

In carrying out the present invention, a front bar 3 is attached adjacent its ends to the chassis 2 and is disposed transversely of the chassis, the bar 3 being upwardly curved intermediate its ends, as shown at 4, to clear the transmission mechanism or other devices commonly found on an automobile. A rear bar 5 is provided, the same being secured adjacent its ends to the chassis 2.

In connection with the bars 3 and 5 there is provided a forward frame shown in detail in Fig. 3. The forward frame includes a front arch 6 embodying depending arms 7, terminated at their lower ends in inwardly extended fingers 7' attached to the bar 3 adjacent its ends in any suitable manner.

A pair of rear arches 8 are provided, each arch 8 including an inner arm 10 and an outer arm 9. The crowns of the arches 8 are connected by means of braces 25 with the forward arch 6 adjacent the points where the crown of the arch 6 merges into the arms 7. The lower ends of the arms 9 of the rear arches 8 are connected with the rear bar 5 adjacent the ends of the rear bar. The lower ends of the arms 10 of the rear arches 8 are connected with the ends of a foot piece 11, the arms 10 being shorter than the arms 9. Intermediate their upper and lower ends, the arms 10 are united by a cross brace 12. The arms 10 and 9 lie, respectively, inside and outside of the walls of the body 1, the foot piece 11 ordinarily resting on the floor of the body 1 and being secured thereto.

The invention comprises a rear frame shown in detail in Fig. 4, the frame in question including an upper loop 14 sustained by a cross brace 15. Extending from the loop are rear arms 16 and forward arms 17. Depending from the rear portion of the loop 14 and located between the rear arms 16 is an intermediate arm 18. The intermediate, rear arm 18 is attached to the back portion of the body 1 of the vehicle, the arms 16 and 17 being secured to the side walls of the body 1.

The numeral 19 indicates a cover of any desired sort, within the contour of which the rear frame shown in Fig. 4 is located. The cover 19 embodies side flaps 20 having slits 21 which receive the crowns of the rear arches 8 of the forward frame. The cover 19 may be supported in any desired manner, as by rear bows 22 of the usual sort, connected at their lower ends to the body 1. The cover 19 is supported, further, by an intermediate bow 23, pivoted to the body, and by forwardly inclined side braces 24 pivoted to the bow 23 intermediate the ends of the said bow and adapted to pass backwardly through the arch 8.

In practical operation, should the vehicle roll over sidewise, the occupants of the vehicle will be shielded and protected, because the forward and rear frames, and particularly because the members 25 and 14 of the respective frames, together with the parts 7, 9, 16 and 17, will come into contact with the ground and prevent a collapsing or crushing of the cover 19. Should the vehicle overturn endwise in a forward direction, the parts 7, 6 and 25 will be effective, and should the vehicle overturn in a rearward direction, the rear frame, shown in Fig. 4, will act as a protection for the occupants of the vehicle.

The arches 8 are disposed diagonally or obliquely with respect to the longitudinal center of the vehicle body, as clearly shown in Fig. 1, so that the outer arms 9 of the arches 8 extend downwardly on the outside of the walls of the vehicle body, the arms 10 extending downwardly, inside of the walls of the body, the foot piece 11 being disposed on the floor of the vehicle body, to the rear of the front seat 50, and the brace 12 being disposed to the rear of the back of the front seat.

Having thus described the invention, what is claimed is:—

In a device of the class described, a vehicle body including a chassis; forward and rear bars assembled with the chassis; a forward arch having its ends connected with the forward bar; a pair of rear arches including outer arms connected with the rear bar, and inner arms; a vehicle supported foot piece uniting the inner arms adjacent their lower ends; a transverse brace uniting the inner arms intermediate their upper and lower ends; and longitudinal braces uniting the forward and rear arches in their upper portions.

In testimony that I claim the foregoing as my own, I have hereto affixed my signature in the presence of two witnesses.

JAMES WILLIAM ELLIS.

Witnesses:
MARTIN F. SPANN,
F. N. MORGAN.